United States Patent
Yuasa et al.

(10) Patent No.: US 8,097,363 B2
(45) Date of Patent: Jan. 17, 2012

(54) POSITIVE ELECTRODE MATERIAL, ITS MANUFACTURING METHOD AND LITHIUM SECONDARY BATTERY

(75) Inventors: Toyotaka Yuasa, Hitachi (JP); Masahiro Kasai, Mito (JP); Genei Nakajima, Kumagaya (JP)

(73) Assignees: Hitachi, Ltd., Tokyo (JP); Hitachi Metals, Ltd., Tokyo (JP); Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/023,087

(22) Filed: Feb. 8, 2011

(65) Prior Publication Data
US 2011/0127463 A1 Jun. 2, 2011

Related U.S. Application Data

(62) Division of application No. 10/787,222, filed on Feb. 27, 2004, now Pat. No. 7,910,246.

(30) Foreign Application Priority Data

Jun. 11, 2003 (JP) .................. 2003-166685

(51) Int. Cl.
*H01M 4/1391* (2010.01)
*H01M 4/505* (2010.01)
*H01M 4/525* (2010.01)
*C01G 53/04* (2006.01)
*C01G 51/04* (2006.01)
*C01G 45/02* (2006.01)

(52) U.S. Cl. ............... 429/231.1; 429/231.3; 423/594.4; 423/594.6

(58) Field of Classification Search .............. None
See application file for complete search history.

(56) References Cited

U.S. PATENT DOCUMENTS

| | | | |
|---|---|---|---|
| 5,326,545 A | 7/1994 | Koksbang et al. | |
| 5,334,334 A | 8/1994 | Koksbang | |
| 5,512,214 A | 4/1996 | Koksbang | |
| 6,066,413 A | 5/2000 | Aymard et al. | |
| 6,383,235 B1* | 5/2002 | Maegawa et al. | 29/623.5 |
| 6,982,132 B1 | 1/2006 | Goldner et al. | |
| 2003/0165739 A1 | 9/2003 | Kizu et al. | |

FOREIGN PATENT DOCUMENTS

CN 1356737 7/2002
(Continued)

OTHER PUBLICATIONS

EP Office Action of Appln. 04006130 dated Jan. 14, 2010 in English.
(Continued)

*Primary Examiner* — Jonathan Crepeau
(74) *Attorney, Agent, or Firm* — Antonelli, Terry, Stout & Kraus, LLP.

(57) ABSTRACT

The object of the invention is to provide positive electrode material in which a discharge rate characteristic and battery capacity are hardly deteriorated in the environment of low temperature of −30° C., its manufacturing method and a lithium secondary battery using the positive electrode material. The invention is characterized by the positive electrode material in which plural primary particles are flocculated and a secondary particle is formed, and the touch length of the primary particles is equivalent to 10 to 70% of the length of the whole periphery on the section of the touched primary particles.

6 Claims, 7 Drawing Sheets

FOREIGN PATENT DOCUMENTS

| | | |
|---|---|---|
| CN | 1360739 | 7/2002 |
| EP | 1 207 572 | 5/2002 |
| EP | 1 220 343 A2 | 7/2002 |
| EP | 1 296 391 A1 | 3/2003 |
| EP | 1 309 022 A2 | 5/2003 |
| EP | 1 391 950 A1 | 2/2004 |
| EP | 1 587 156 A1 | 10/2005 |
| JP | 07-245106 | 9/1995 |
| JP | 8-213015 | 8/1996 |
| JP | 2000-243394 | 9/2000 |
| JP | 2001-085006 | 3/2001 |
| JP | 2001-155729 | 6/2001 |
| JP | 2002-243951 | 9/2001 |
| JP | 2002-42811 | 2/2002 |
| JP | 2002-279984 | 9/2002 |
| JP | 2002-279985 | 9/2002 |
| JP | 2003-34538 | 2/2003 |
| JP | 2003-229124 | 8/2003 |
| JP | 2004-083388 | 3/2004 |
| JP | 2004-087487 | 3/2004 |
| JP | 2004-192846 | 7/2004 |
| JP | 2004-281253 | 7/2004 |
| TW | 499397 | 8/2002 |
| WO | WO 01/04975 | 1/2001 |
| WO | WO 02/086993 A1 | 10/2002 |
| WO | WO 03/044881 | 5/2003 |

OTHER PUBLICATIONS

Partial EP Search Report in English EP Appln. 04006130 dated Aug. 11, 2009.

* cited by examiner

POSITIVE ELECTRODE MATERIAL, ITS MANUFACTURING METHOD AND LITHIUM SECONDARY BATTERY

CROSS-REFERENCE TO RELATED APPLICATION

This application is a divisional of U.S. application Ser. No. 10/787,222, filed Feb. 27, 2004, now U.S. Pat. No. 7,910,246, the contents of which are incorporated herein by reference.

FIELD OF THE INVENTION

The present invention relates to a new positive electrode, its manufacturing method and a lithium secondary battery using the positive electrode.

BACKGROUND OF THE INVENTION

The development of a high-output and high-energy density battery for each power source of an electric vehicle and a hybrid powered vehicle as an automobile in which care is given to environment is demanded. As the voltage is high and the energy density is high as to a lithium secondary battery using non-aqueous electrolytic solution as a battery used for these, the development is energetically advanced in each field. Besides, as for a battery for an automobile, a long life characteristic, stable voltage controllability, resistance to environment, large-sizing and the reduction of the cost are demanded in addition to characteristics of a conventional type private battery.

As for a battery for an automobile, the secure operation in a wide temperature range from low temperature to high temperature is demanded. Particularly, as the electric conductivity of a lithium ion in electrolytic solution is deteriorated at low temperature and the characteristics of the battery are greatly deteriorated, it is proposed that the discharge rate of the battery is improved.

The form of a particle of lithium transition metal composite oxide which is the material of a positive electrode is closely related to the discharge rate. Particularly, as the specific surface of positive electrode material is related to the area of a solid-liquid interface on which the positive electrode material and electrolytic solution act, it has an effect upon the discharge rate. Therefore, in JP-A 245106/1995, a lithium secondary battery made excellent in a high discharge rate characteristic by using positive electrode material the specific surface of which is high is proposed.

In the meantime, in JP-A 37576/1995, positive electrode material provided with large capacity and made excellent in charging/discharging efficiency by a secondary particle having particle structure that the layer-structure surface of a monocrystalline particle of positive electrode material having a crystal of layer structure is exposed outside is proposed.

Besides, in JP-A 85006/2001, the lithium secondary battery capacity of which is large and which is made satisfactory in a cycle characteristic by defining the voidage in a secondary particle of positive electrode material so as to optimize particle structure in lithium-nickel composite oxide is proposed.

Secure operation in a wide temperature range from low temperature to high temperature is demanded for a battery for an automobile. When a lithium secondary battery is operated at low temperature, the ionic conductivity of electrolytic solution is extremely deteriorated at low temperature. For example, in a conventional type battery, the ionic conductivity at −30° C. of electrolytic solution including $LiPF_6$ which is electrolytic solution in a mixed solvent of ethyl carbonate (EC) and dimethyl carbonate (DMC) is approximately ¼ of that at room temperature. Therefore, even a lithium secondary battery that acquires a sufficient characteristic at room temperature can acquire only a low battery characteristic at low temperature. Besides, as long life is demanded for a battery for an automobile, the maintenance of a cycle characteristic is also essential at the same time as a low-temperature characteristic.

In JP-A 245106/1995, the effect to some extent is recognized at room temperature, however, in the environment of low temperature, a discharge rate characteristic demanded for an electric vehicle or a hybrid electric vehicle is insufficient. Besides, in JP-A 37576/1995, a discharge rate characteristic at low temperature is also insufficient in the above-mentioned particle structure. In the meantime, as for the positive electrode material disclosed in JP-A 85006/2001, as the quantity of Ni included in transition metal is 50% or more, the expansion/the contraction caused by charge/discharge of a crystal lattice is large. The cycle characteristic is enhanced by increasing the voidage in the secondary particle up to 10% or more from a value below 10% so as to reduce the effect of the change in volume of the lattice in the composition. Besides, the density of positive electrode material is enhanced by setting the voidage to 30% or less and service capacity is increased. However, the discharge rate at low temperature is insufficient.

SUMMARY OF THE INVENTION

The object of the invention is to provide positive electrode material, its manufacturing method and a lithium secondary battery using the positive electrode material in which the discharge rate characteristic and the battery capacity in the environment of the low temperature of −30° C. are hardly deteriorated and which are excellent in a cycle characteristic.

These inventors paid attention to the particle structure of a secondary particle in which plural primary particles were combined and flocculated. They found that as the ionic conductivity of electrolytic solution was deteriorated at low temperature, a conductive network between primary particles locally decreased in case primary particles of positive electrode material formed by secondary particles in each of which primary particles were flocculated were apart and electrolytic solution was filled between the primary particles, resistance increased and the voltage drop of a battery occurred. They propose the following structure in which the conductive network can be also maintained in the environment of low temperature by increasing the touch area of primary particles in consideration of a fact that the touch area of primary particles is important because in the environment of low temperature, not Li ionic conduction via electrolytic solution but Li ionic diffusion between primary particles is a dominant factor and therefore, the ionic conductivity of electrolytic solution is deteriorated at low temperature.

These inventors clarifies that when 10% or more of the whole circumference of a primary particle on the observed substantially central section of a secondary particle is combined with another primary particle, a battery characteristic at −30° C. is hardly deteriorated.

In the meantime, as a void existing in a secondary particle holds electrolytic solution, the void is necessary to maintain a discharge rate rechargeable capacity at room temperature at which the ionic conductivity of the electrolytic solution is high. Therefore, as a void exists in a secondary particle, contact between primary particles is limited as follows. These inventors clarified that when a primary particle was in contact with another primary particle and the sum of the length of the shared side was 70% or less, compared with the periphery of the section of each touched primary particle, the amount required to maintain rechargeable capacity of a void existing in a secondary particle was acquired. The desirable range is 50 to 70%. In this case, it is clear that when the Ni content of transition metal which is the composition of positive electrode material according to the invention is below 50%, a crystal lattice in charge/discharge hardly varies in volume, primary particles are also hardly distorted in case contact between them is satisfactory and a cycle characteristic is excellent.

Besides, in case a void exists in a state in which the void covers the circumference of a primary particle and the primary particle and the adjacent primary particle are apart, a conductive network in the environment of low temperature is inhibited. Therefore, a minimum void exists in a secondary particle in a state in which the void does not cover a primary particle and voidage acquired by dividing the sectional area of the void formed between primary particles on the cut section of the secondary particle by the sectional area of the whole secondary particle is 2.5 to 35% and desirably, is 2.5 to 10%. In this case, if the voidage is 2.5% or less, the maintainability of electrolytic solution is deteriorated, the room-temperature characteristic is deteriorated, and therefore, the voidage for maintaining the rechargeable capacity at room temperature is 2.5% or more. In the meantime, if the voidage is 35% or more, a conductive network is inhibited and the low-temperature characteristic is deteriorated.

To achieve the above-mentioned touch area and the voidage of primary particles, a range of the diameters of a primary particle forming a secondary particle is also important. That is, in case a primary particle diameter is smaller than 0.2 μm, primary particles which can be filled in spatial volume are limited, the voidage increases and a range of the voidage of the secondary particle cannot be achieved. In the meantime, in case a primary particle diameter is larger than 10 μm, the diameter of the secondary particle formed by some primary particles exceeds 40 μm and it is difficult to form the electrode of a lithium secondary battery for an electric vehicle or a hybrid electric vehicle.

As an Li ion is desorbed or absorbed from/into a Li layer in positive electrode material having a crystal of layer structure, it is advantageous in the diffusion of an Li ion that the orientations of c axes of crystals are uniform. Therefore, in a secondary particle in which primary particles are flocculated, it is desirable that a network of primary particles in which the primary particles are in contact and the c axes of crystals are uniform exists. In this case, it is considered when the conductivity of an Li ion in positive electrode material having a crystal of two-dimensional layer structure is considered that the more the number of primary particles the orientations of c axes of which are uniform out of primary particles forming a secondary particle is, the higher probability that the Li ion conductivity of the whole secondary particle is enhanced is.

Then, the following method of unifying the orientations of c axes of planar crystals by changing the aspect ratio of a crystal particle of positive electrode material having a crystal of layer structure was examined. That is, lithium carbonate was made to function as flux by adding lithium carbonate more than stoichiometric composition in a process for burning positive electrode material having a crystal of layer structure, the orientation of the a-b plane of the crystal was preferentially grown, as to 60% or more of primary particles in a secondary particle as a plate crystal of the positive electrode material having the crystal of layer structure, the orientations of c axes of crystals could be unified within ±10 degrees (20 degrees) and desirably, could be unified within ±5 degrees (10 degrees).

Or the result of producing batteries for testing by positive electrode material having a crystal of later structure which were varied in the amount of added lithium carbonate and burned temperature and testing a discharge rate characteristic at low temperature, a situation of contact between primary particles acquired by observing the section of a secondary particle of the positive electrode material having the crystal of the acquired layer structure and relation among the orientations of c axes of the primary particles were examined. As a result, it was found that when plural conditions that the outside periphery of the section of the primary particles forming the secondary particle of the positive electrode material having the crystal of the acquired layer structure shared sides with another primary particle and was in contact with it, the sum in length of shared sides was in a range of 10 to 70%, voidage divided by the sectional area of the whole secondary particle was 2.5 to 35% and as to 60% or more of the number of the primary particles, the orientations of c axes were within ±10 degrees were met, a high discharge rate characteristic at low temperature was acquired.

The invention is characterized by a method of manufacturing positive electrode material by grinding material powder including Li, Ni, Mn and Co after the material powder is sintered at 950 to 1100° C., desirably at 1000 to 1050° C.

It is desirable that the material powder includes lithium carbonate, nickel oxide, manganese dioxide and cobalt oxide or that the material powder is sintered after it is granulated and dried by a spray dryer.

As described above, these inventors found that layered positive electrode material excellent in a discharge rate at low temperature could be produced by optimizing the structure of the layered positive electrode material and its manufacturing method and controlling powder characteristics such as the diameter of primary particles forming the layered positive electrode material, the particle size distribution of a secondary particle which was a flocculated body of primary particles and the voidage of the secondary particle as a result of examining the fine particle structures and the low-temperature discharge rates of various layered positive electrode material. It is each size of a primary particle and a secondary particle, the voidage of the secondary particle, contact between primary particles and their distribution in the structure of the secondary particle in which primary particles are flocculated that are particularly important in positive electrode material having a crystal of layer structure, and it is to control the structure of the secondary particle by the particle size of the original substance, burned temperature and reaction time when Li is doped that are particularly important.

DETAILED DESCRIPTION OF THE PREFERRED EMBODIMENTS

The invention is not limited to the following examples.

EXAMPLE 1

In this example, for material, manganese dioxide, cobalt oxide, nickel oxide and lithium carbonate are used, they are balanced in an atomic percentage so that the ratio of Ni, Mn and Co is 1:1:1 and the ratio of Li to (NiMnCo) is 1.02:1, demineralized water is added to them, and they are ground and mixed by a ball mill using a pot made of resin and a zirconia ball for 20 hours in a wet process. After polyvinyl alcohol (PVA) solution is added to mixed liquid by one mass percent in terms of solid content ratio, the mixed liquid is mixed further for one hour, is granulated and dried by a spray dryer and particles 5 to 100 μm in size are produced. Next, a crystal having layer structure is produced by burning these particles at 1000° C. for 3 to 10 hours, afterward, is ground and positive electrode material is acquired.

Figure 1:
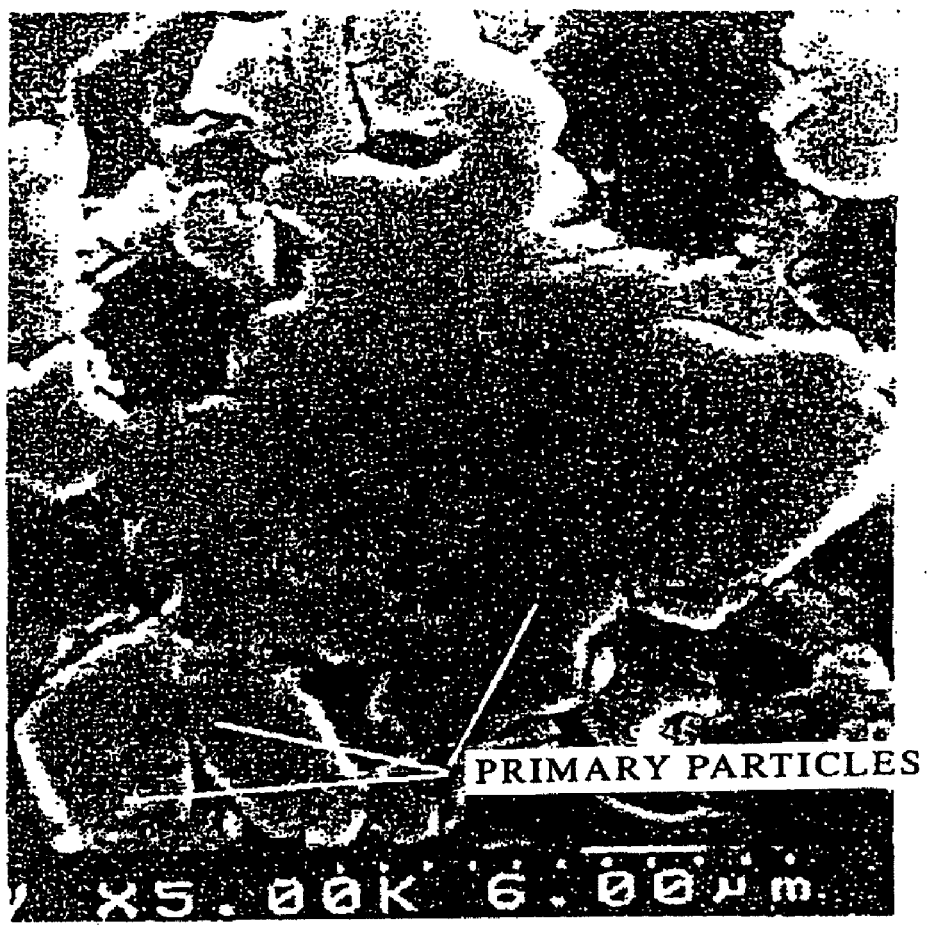
FIG. 1 shows positive electrode material having a crystal of layer structure according to the invention and observed by a scanning electron microscope.
Figure 2:
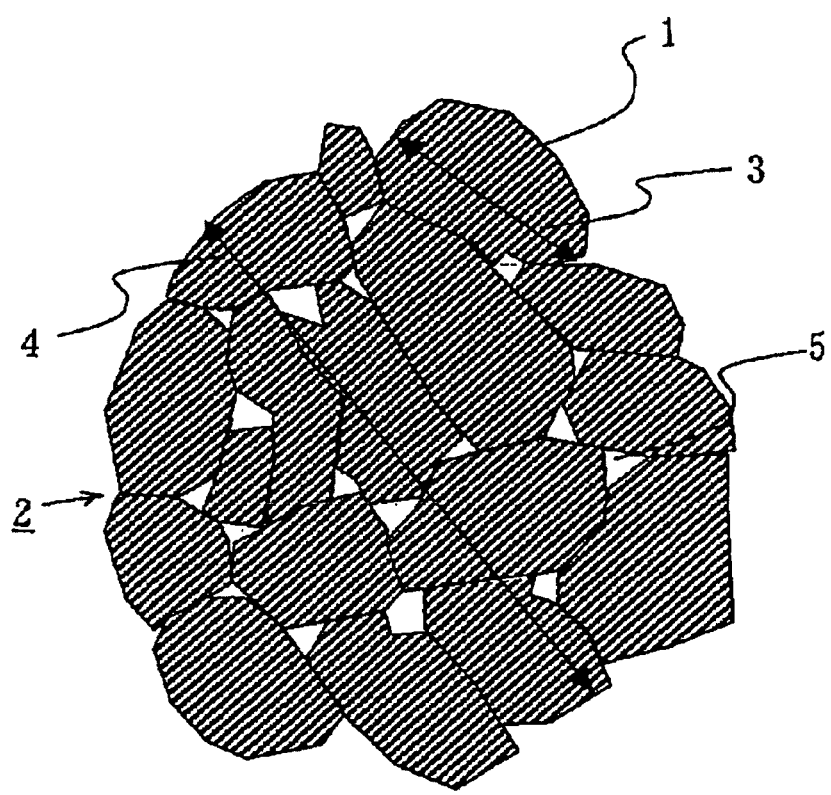
FIG. 2 is a schematic drawing showing positive electrode material having the crystal of layer structure according to the invention.

FIG. 1 shows a photograph (7,000 times) showing the section SEM of positive electrode material powder according to the invention. FIG. 2 is a schematic drawing showing the section of a secondary particle of positive electrode material having a crystal of layer structure according to the invention. As for the positive electrode material, primary particles 1 are flocculated and a secondary particle 2 is formed. FIG. 2 is schematically shown so that this schematic drawing is easy to understand and an actual particle form is not specified. Besides, the sectional area of the secondary particle is defined by area encircled by the outside periphery of the primary particles forming the secondary particle as shown in FIG. 1.

A method of measuring secondary particle sectional structure at this time is as follows. A sample acquired by cutting the substantial center of the secondary particle by a focused ion beam or by burying the secondary particle in resin, cutting and polishing the vicinity of the center is observed at the magnification of 3,000 times using an electron microscope, and the diameter of the primary particle, the diameter of the secondary particle and the length of the contact of the primary particles are measured by image processing. At this time, each diameter of the primary particle and the secondary particle is defined as the fretted diameter of each longest part. Besides, the sectional area of the secondary particle and the sectional area of a void 5 are acquired by the image processing of an image acquired by the electron microscope. In this case, the sectional area of the secondary particle is area when the outside periphery of primary particles forming the unfixed shape of secondary particle is linked.

The primary particle diameter 3 is defined as a fretted diameter, the mean particle diameter of the primary particle diameter 3 is 0.2 to 10 μm and the secondary particle diameter 4 is 5 to 30 μm. Besides, the ratio of a value acquired by dividing the sum in length of the shared and mutually linked sides of individual primary particles on the section of the primary particles forming the secondary particle by the outside periphery of the section of the primary particles to the sum in length of the shared sides with the outside periphery of the primary particles is calculated. Further, the ratio is calculated for all primary particles in the secondary particle, the mean value is calculated and as a result, the ratio of the shared sides of the primary particles and the outside periphery is 50 to 70%. The minimum voids 5 exist in the secondary particle and the voidage acquired by dividing the area of the voids by the section of the secondary particle is 2.5 to 35%.

In producing a positive electrode for evaluating the characteristics of positive electrode material having a crystal of layer structure, after positive electrode material having the crystal of layer structure, carbonaceous conductive material and a binder are mixed at the ratio of 85:10.7:4.3 in terms of mass percentage and uniformly mixed slurry is applied 15 μm thick aluminum foil used as current collector, it is dried at 110° C., is pressurized by 1.5 ton/cm² by a press and a dry paint film approximately 40 μm thick is formed. A battery for testing is produced using the positive electrode and a lithium electrode as a counter electrode. At this time, for electrolytic solution, a mixed solvent of ethyl carbonate and dimethyl carbonate using $LiPF_6$ of 1.0M as an electrolyte is used.

Table 1 shows a discharge characteristic showing relation between the voltage and the rechargeable capacity at −30° C. in this battery for testing. After the battery is charged up to 4.2 V on a charging condition of 0.5 C, it is discharged up to 3.0 V on a temperature condition of −30° C. and on a discharging condition of 1 C. As shown in Table 1, the voltage and the rechargeable capacity at −30° C. in example 1 both have high values, compared with those in a comparative example 1 described later. Further, the service capacity at the voltage of 3.5 V in example 1 is also 5 mAh/g and excellent.

TABLE 1

| | Rechargeable capacity at low temperature at 3.5 V (mAh/g) | Rechargeable capacity at low temperature at 3.0 V (mAh/g) |
|---|---|---|
| Example 1 | 4.5 | 13 |
| Example 2 | 6 | 9.8 |
| Comparative Example 1 | 2 | 4 |

Besides, positive electrode material having a crystal of layer structure the contact of the primary particles and the voidage in the secondary particle of which are varied by changing a burning condition of positive electrode material having the crystal of layer structure is produced. In this case, when burning time is extended, the touch area of the primary particles increases because crystal growth proceeds. A prototype battery is produced based upon this material and a discharge rate test at the room temperature of 25° C. and at the low temperature of −30° C. is made.

Figure 3:
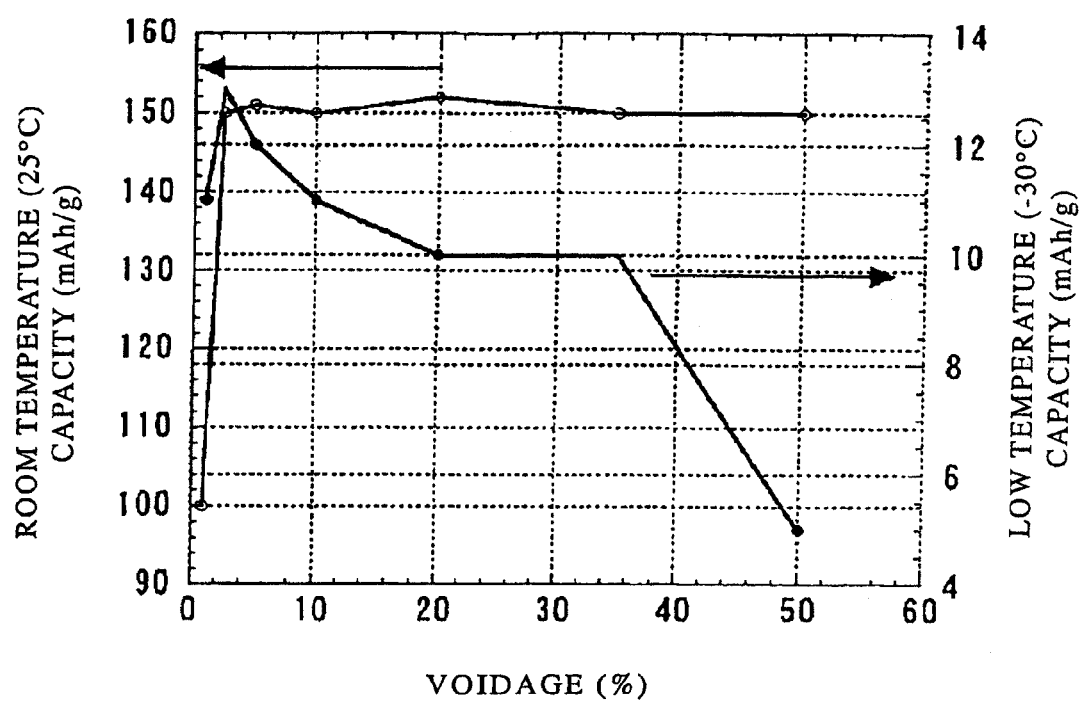
FIG. 3 is a chart showing relation between voidage and rechargeable capacity at room temperature and at low temperature.

FIG. 3 is a chart showing relation between voidage and rechargeable capacity. When the voidage is 2.5% or less, the room-temperature rechargeable capacity is 100 mAh/g and low, in the meantime, when the voidage exceeds 35%, the rechargeable capacity at the low temperature of −30° C. is rapidly deteriorated. However, when the voidage is in a range of 2.5 to 35% according to the invention, high rechargeable capacity that the rechargeable capacity is approximately 150 mAh/g at 25° C. and is 10 mAh/g or more at −30° C. is acquired.

Comparative Example 1

Figure 4:
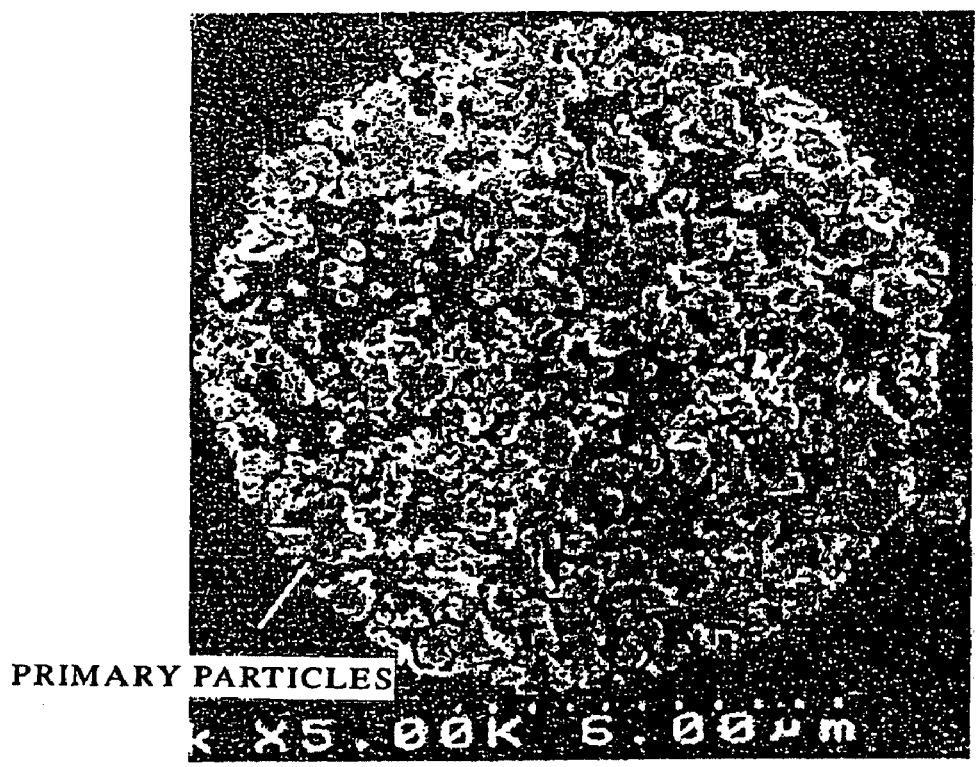
FIG. 4 shows positive electrode material having a crystal of layer structure according to a first comparative example and observed by a scanning electron microscope.
Figure 5:
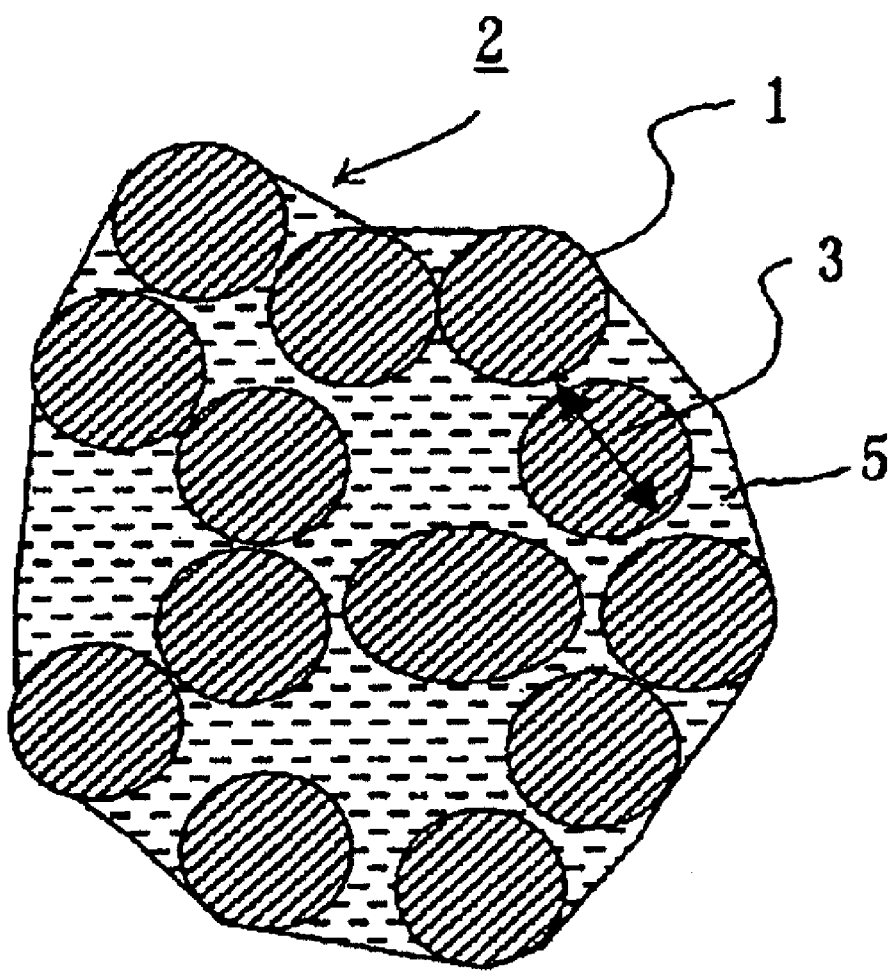
FIG. 5 is a schematic drawing showing the positive electrode material having the crystal of layer structure according to the first comparative example.

In this comparative example, the positive electrode material having the crystal of layer structure described in example 1 is burnt at 900° C. FIG. 4 shows a photograph (7,000 times)

showing the section SEM of the positive electrode material having the crystal of layer structure. FIG. 5 is a schematic sectional view showing its secondary particle. As burning temperature is low, the growth of the crystal is insufficient and there are few locations in which primary particles 1 are in contact. Besides, as crystal growth is insufficient, the diameter 3 of each primary particle forming the secondary particle 2 is also short and touch area between the primary particles is small. As in example 1, as a result of calculating the ratio of the shared side of the primary particles and the outside periphery for all the primary particles in the secondary particle and calculating a mean value, the ratio is 10% or less. Besides, as touch area between the primary particles is small, a void 6 is widely formed. As in example 1, as a result of measuring voidage, the voidage is 41% or more.

Next, a testing battery is produced using the positive electrode material having the crystal of layer structure by the electrode production process and the testing battery production process respectively described in example 1. As for the characteristics at −30° C. of this testing battery, a discharge rate at low temperature is low as shown in Table 1. As touch area between the primary particles is small, a low-temperature rate characteristic at −30° C. is deteriorated.

Comparative Example 2

As in example 1, mixture is made so that in atomic percentage, the ratio of Ni to Co is 0.85:0.15 and the ratio of Li to NiCo is 1.02:1 and positive electrode material is produced by the similar method to that in example 1.

EXAMPLE 2

Materials are mixed by the method of producing the positive electrode material having the crystal of layer structure described in example 1 so that the ratio of Li to NiMnCo is 1.1:1 and positive electrode material having a crystal of layer structure is produced. A sample for measurement is produced by cutting the substantial center of a secondary particle of the material by a focused ion beam or polishing after the secondary particle is buried in resin.

A method of measuring the orientation of a primary particle in the sectional structure of the secondary particle at this time is as follows. The sample for measurement is produced by cutting the substantial center of the secondary particle by a focused ion beam or polishing after the secondary particle is buried in resin. Next, the crystal orientation of the sample is acquired by electron backscatter diffraction (EBSD). This method is a method of analyzing a crystal orientation by analyzing Kikuchi line from back scattering when an electron beam of an electron microscope irradiates each primary particle.

Figure 6:
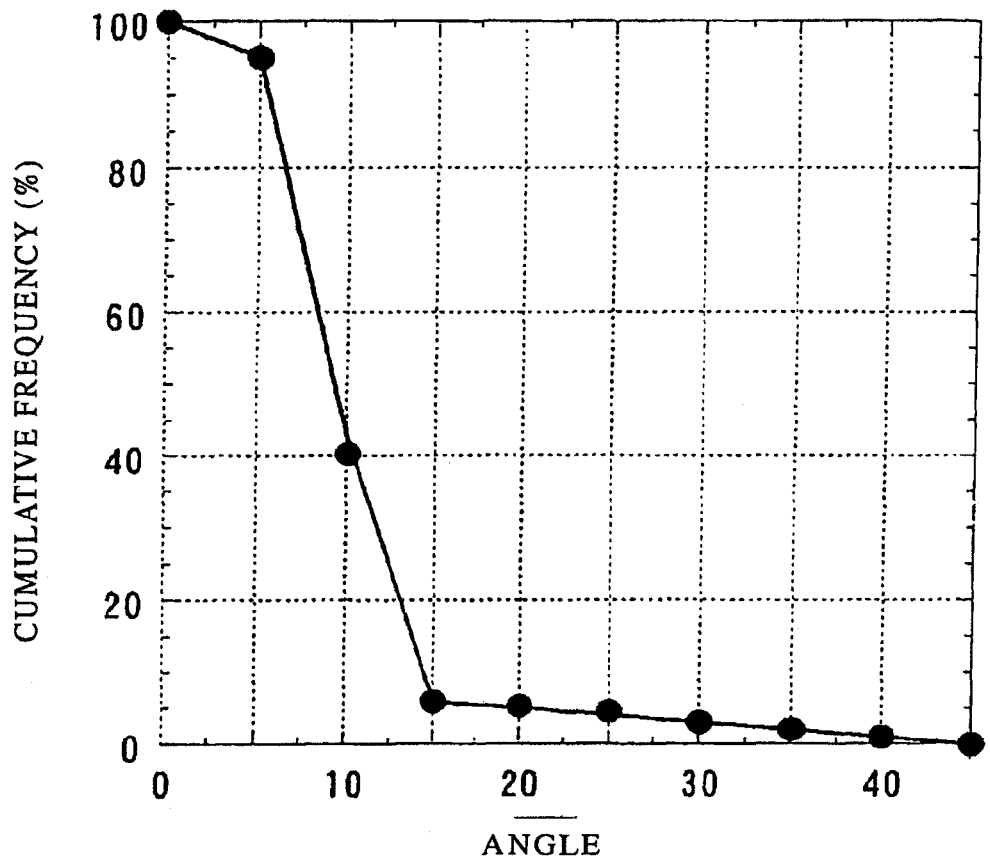
FIG. 6 shows the distribution of orientations of c axes of crystals of primary particles in a secondary particle.

FIG. 6 is a chart showing relation between an angle representing the orientation of a c axis of a primary particle in a secondary particle and a cumulative frequency. Angles on the x-axis are plus and minus values based upon the c axis. In this embodiment, burning is also tested on various burning conditions. FIG. 6 shows that 60% of primary particles are within ±10 degrees (20 degrees) based upon the orientation of a c axis. Approximately 5% of primary particles are within ±15 degrees or more based upon the c axis. Therefore, 95% or more of primary particles in the secondary particle are within ±15 degrees based upon the c axis, further, approximately 35% of primary particles are within ±15 degrees exceeding ±10 degrees, approximately 55% of primary particles are within ±10 degrees exceeding ±5 degrees and approximately 5% of primary particles are within ±5 degrees.

Next, a battery for testing is produced by the electrode production method and the testing battery production method respectively disclosed in example 1 using the positive electrode material having a crystal of the layer structure. As for a battery characteristic at −30° C. of this battery for testing, the voltage is 3.5 V as shown in Table 1, the rechargeable capacity is 6 mAh/g and the battery has an excellent discharge rate at lower temperature than that in example 1. As touch area between primary particles is great and the orientations of c axes of primary particles are unified, a low-temperature rate characteristic at −30° C. is excellent.

<Measuring the Change of Lattice Volume in Charge/discharge>

Figure 7:
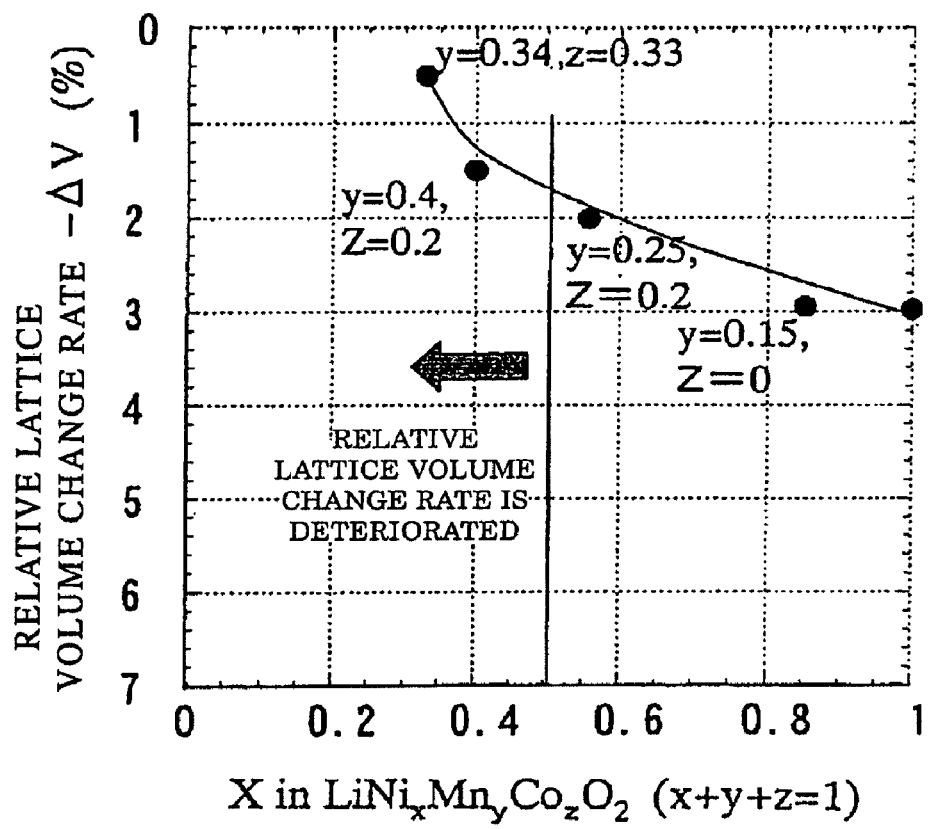
FIG. 7 shows relation between a relative lattice volume rate of change and X in $LiN_xMn_yCo_zO_2$.

FIG. 7 shows relation between a relative lattice volume change rate acquired by producing electrodes by the positive electrode materials described in example 1 and the second comparative example and measuring lattice constants of the positive electrode materials when they are charged up to 4.2 V and 3.4 V using the electrodes based upon diffraction by X rays and X in $LiN_xMn_yCo_zO_2$. In this case, the relative lattice volume change rate is a value acquired by dividing lattice volume in charge up to 4.2 V by lattice volume in charge up to 3.4 V. When the percentage content of Ni is 50% or less, the relative lattice volume change rate decreases.

<Charge/Discharge Cyclic Testing>

A 18650-type battery is produced using the positive electrode materials in example 1 and the second comparative example for charge/discharge cyclic testing. The production of the battery is as follows. First, the positive electrode material in example 1, graphite conductive material, carbon black conductive material and polyvinylidene fluoride (PVDF) are mixed in the weight percentage of 80:12:3:5, N-methyl-2-pirolidone of a suitable amount is added and slurry is produced. The slurry is agitated for three hours by a planetary mill to mix sufficiently. Next, the slurry is coated on aluminum foil 15 μm thick using a roller printing-type coater. This is pressed by a roller press so that the electrode composite density is 2.5 g/cm³. Further, an electrode is similarly produced on the reverse side to the coated surface. Polyvinylidene fluoride (PVDF) is added to amorphous carbon used as negative electrode by the weight percentage of 6.5 wt %. Then the amorphous carbon is agitated for thirty minutes in a slurry mixer for sufficient mixing. The slurry is coated on both sides of electrolytic copper foil 15 μm thick by the coater, after it is dried, it is pressed by the roller press and the negative electrode is acquired.

The positive electrode and the negative electrode are cut in predetermined size and a current collecting tab is installed in an uncoated part of each electrode by ultrasonic welding. After a polyethylene film is cylindrically wound between the positive electrode and the negative electrode, they are inserted into a 18650-type battery can. After the collecting tab and a battery can lid are connected, the battery can lid and the battery can are welded by laser welding and the battery is sealed.

Next, the electrolyte is injected from an inlet provided to the battery can and the 18650-type battery is acquired. Charge/Discharge cyclic testing is applied to the 18650-type battery and a cycle characteristic is investigated. A condition of the charge/discharge cyclic testing is that charging is performed at the constant current of 1 mA/cm² and constant voltage up to charge final voltage 4.2 V, discharging is performed at the constant current of 1 mA/cm² up to discharge final voltage 3.0 V after a pause for thirty minutes and this process is repeated by 500 cycles. At this time, testing environment temperature is set to 60° C.

Table 2 shows the capacity maintenance rate (percentage acquired by dividing rechargeable capacity in a first cycle by rechargeable capacity in a 500th cycle) of each battery for testing when the positive electrode materials described in example 1 and the second comparative example are used. As lattice volume hardly changes in the composition in example 1, a secondary particle is hardly decayed in a charge/discharge cycle, and a satisfactory cycle characteristic that the rechargeable capacity in the 500th cycle is equivalent to 85% of the rechargeable capacity in the first cycle can be acquired. In the meantime, as lattice volume greatly changes in the composition of the positive electrode material described in the second comparative example, the rechargeable capacity in the 500th cycle is equivalent to 40% of the rechargeable capacity in the first cycle and a cycle characteristic is deteriorated.

TABLE 2

|  | Percentage content (%) of Ni in transition metal | Voidage (%) of positive electrode material | Capacity maintenance rate (%) of lithium secondary battery |
|---|---|---|---|
| Example 1 | 33 | 3.6 | 85 |
| Comparative example 2 | 85 | 3.6 | 40 |

As described above, according to this example, the positive electrode material excellent in a discharge rate characteristic and battery capacity at low temperature of a lithium secondary battery using the positive electrode material having the crystal of layer structure improved in particle structure, its manufacturing method and the high-output and high-energy density non-aqueous lithium secondary battery using the positive electrode material can be provided.

According to the invention, the positive electrode material excellent in the discharge rate characteristic and the battery capacity at low temperature of the lithium secondary battery using the positive electrode material having the crystal of layer structure improved in particle structure, its manufacturing method and the high-output and high-energy density non-aqueous lithium secondary battery using the positive electrode material can be provided.

What is claimed is:

1. A method of manufacturing positive electrode material, wherein:

material powder including Li, Ni, Mn and Co is ground after it is burned at 950 to 1100° C.;

plural primary particles are flocculated and a secondary particle is formed;

length in which the primary particles are linked on a section of the secondary particle is equivalent to 50 to 70% of the length of the whole periphery on a section of the primary particles;

the secondary particle is represented as $Li_aMn_xNi_yCo_zO_2$; and the secondary particle is composed of crystals having layer structure of composite oxide meeting $1 \leq a \leq 1.2$, $0 \leq x \leq 0.65$, $0.33 \leq y < 0.5$, $0 \leq z \leq 0.65$ and $x+y+z=1$.

2. A method of manufacturing positive electrode material according to claim 1, wherein:

the material powder includes lithium carbonate, nickel oxide, manganese dioxide and cobalt oxide.

3. A method of manufacturing positive electrode material according to claim 2, wherein:

the material powder is burned after it is granulated and dried by a spray dryer.

4. A method of manufacturing positive electrode material according to claim 1, wherein:

the mean diameter of the primary particle is 0.2 to 10 μm.

5. A method of manufacturing positive electrode material according to claim 4, wherein:

the mean diameter of the secondary particle is 5 to 30 μm.

6. A method of manufacturing positive electrode material, wherein plural primary particles flocculated and a secondary particle is formed; and length in which the primary particles are linked on a section of the secondary particle is equivalent to 50 to 70% of the length of the whole periphery on a section of the primary particles;

the secondary particle is represented as $Li_aMn_xNi_yCo_zO_2$; and the secondary particle is composed of crystals having layer structure of composite oxide meeting $1 \leq a \leq 1.2$, $0 \leq x \leq 0.65$, $0.33 \leq y < 0.5$, $0 \leq z \leq 0.65$ and $x+y+z=1$, wherein:

the material powder including lithium carbonate, nickel oxide, manganese dioxide and cobalt oxide is granulated and dried by a spray dryer, and is burned at 950 to 1100° C., and then is ground so that the mean diameter of the primary particle is 0.2 to 10 μm.

* * * * *